(12) United States Patent
Kuze (10) Patent No.: US 9,897,022 B2
(45) Date of Patent: Feb. 20, 2018

(54) CONTROL APPARATUS FOR INTERNAL COMBUSTION ENGINE

(71) Applicant: TOYOTA JIDOSHA KABUSHIKI KAISHA, Toyota-shi, Aichi-ken (JP)

(72) Inventor: Yasuhiro Kuze, Numazu (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 14/780,168

(22) PCT Filed: Jan. 8, 2014

(86) PCT No.: PCT/JP2014/050141
§ 371 (c)(1),
(2) Date: Sep. 25, 2015

(87) PCT Pub. No.: WO2014/156210
PCT Pub. Date: Oct. 2, 2014

(65) Prior Publication Data
US 2016/0047339 A1    Feb. 18, 2016

(30) Foreign Application Priority Data
Mar. 27, 2013 (JP) ................................. 2013-066968

(51) Int. Cl.
*F02D 41/00* (2006.01)
*F02D 41/08* (2006.01)
(Continued)

(52) U.S. Cl.
CPC ........... *F02D 41/0077* (2013.01); *F02D 9/08* (2013.01); *F02D 31/005* (2013.01);
(Continued)

(58) Field of Classification Search
CPC ......... F02M 26/06; F02D 9/08; F02D 9/1055; F02D 41/005; F02D 41/0052;
(Continued)

(56) References Cited

U.S. PATENT DOCUMENTS 6,006,723 A    12/1999    Akabori et al.
6,279,551 B1    8/2001    Iwano et al.
(Continued)

FOREIGN PATENT DOCUMENTS

EP    0881375 A2    12/1998
EP    0889216 A2    1/1999
(Continued)

OTHER PUBLICATIONS

Notice of Allowance dated Oct. 12, 2016, issued in U.S. Appl. No. 14/780,013.
(Continued)

*Primary Examiner* — Phutthiwat Wongwian
*Assistant Examiner* — Jessica Kebea
(74) *Attorney, Agent, or Firm* — Andrews Kurth Kenyon LLP (57) ABSTRACT

An engine includes a turbocharger, an air bypass valve, a wastegate valve, and an EGR apparatus. The engine also includes an ISC passage that connects an upstream side and a downstream side of a throttle valve in an intake passage, and an ISC valve that adjusts an amount of air flowing through the ISC passage. A control apparatus for the engine performs valve opening control to set an opening of an ISC valve at a larger opening than a reference opening when a required torque required by the engine is smaller than an estimated torque that can be generated by the engine, and closes the air bypass valve and the wastegate valve for a fixed period following completion of the valve opening control when an EGR valve of a low pressure EGR appa-
(Continued)

ratus is opened during execution of the valve opening control.

1 Claim, 8 Drawing Sheets (51) Int. Cl.
| | |
|---|---|
| *F02D 41/30* | (2006.01) |
| *F02D 41/40* | (2006.01) |
| *F02D 9/08* | (2006.01) |
| *F02D 31/00* | (2006.01) |
| *F02P 5/05* | (2006.01) |
| *F02M 26/02* | (2016.01) |
| *F02M 26/04* | (2016.01) |
| *F02M 26/05* | (2016.01) |
| *F02M 26/06* | (2016.01) |
| *F02M 26/07* | (2016.01) |
| *F02M 26/52* | (2016.01) |
| *F02M 26/09* | (2016.01) |
| *F02M 26/10* | (2016.01) |

(52) U.S. Cl.
CPC ....... *F02D 41/005* (2013.01); *F02D 41/0007* (2013.01); *F02D 41/08* (2013.01); *F02D 41/3076* (2013.01); *F02D 41/401* (2013.01); *F02M 26/02* (2016.02); *F02M 26/04* (2016.02); *F02M 26/05* (2016.02); *F02M 26/06* (2016.02); *F02M 26/09* (2016.02); *F02M 26/10* (2016.02); *F02M 26/52* (2016.02); *F02P 5/05* (2013.01); *Y02T 10/144* (2013.01); *Y02T 10/44* (2013.01); *Y02T 10/47* (2013.01)

(58) Field of Classification Search
CPC .. F02D 41/083; F02D 41/086; F02D 41/0077; F02D 41/007; F02D 41/3076; F02D 41/401; F02D 31/005; F02P 5/05
USPC ........................................................ 60/605.2
See application file for complete search history.

(56) References Cited

U.S. PATENT DOCUMENTS

| | | | | |
|---|---|---|---|---|
| 8,371,276 | B2* | 2/2013 | Pursifull | B60T 17/06 |
| | | | | 123/336 |
| 8,596,065 | B2* | 12/2013 | Okada | F02B 37/16 |
| | | | | 123/568.17 |
| 9,115,657 | B2* | 8/2015 | Yoshioka | F02B 33/00 |
| 9,359,940 | B2* | 6/2016 | Ahrns | F02B 37/14 |
| 2006/0137660 | A1 | 6/2006 | Shirakawa et al. | |
| 2009/0301447 | A1 | 12/2009 | Gates et al. | |
| 2012/0023937 | A1 | 2/2012 | Styles et al. | |
| 2014/0130493 | A1* | 5/2014 | Spix | F01M 13/023 |
| | | | | 60/599 |
| 2015/0082790 | A1* | 3/2015 | Yoshioka | F02B 37/16 |
| | | | | 60/605.2 |
| 2016/0047350 | A1 | 2/2016 | Kuze | |
| 2016/0053695 | A1 | 2/2016 | Kuze | |
| 2016/0061126 | A1 | 3/2016 | Kuze | |

FOREIGN PATENT DOCUMENTS

| | | | |
|---|---|---|---|
| JP | S59115444 A | | 7/1984 |
| JP | S59115445 A | | 7/1984 |
| JP | S59224440 A | | 12/1984 |
| JP | S6017234 A | | 1/1985 |
| JP | 61-025934 A | | 2/1986 |
| JP | H06159152 A | | 6/1994 |
| JP | 2000-154751 A | | 6/2000 |
| JP | 2000-297663 A | | 10/2000 |
| JP | 2001-090543 A | | 4/2001 |
| JP | 2002-030974 A | | 1/2002 |
| JP | 2003-027921 A | | 1/2003 |
| JP | 2004-346917 A | | 12/2004 |
| JP | 2005-090273 A | | 4/2005 |
| JP | 2006183558 A | | 7/2006 |
| JP | 2007085198 A | | 4/2007 |
| JP | 2007177794 A | | 7/2007 |
| JP | 2008-038662 A | | 2/2008 |
| JP | 2009013872 A | | 1/2009 |
| JP | 2010190052 A | | 9/2010 |
| JP | 2012-007547 A | | 1/2012 |
| JP | 2012017708 A | * | 1/2012 |
| JP | 2012-102617 A | | 5/2012 |
| JP | 2012-158997 A | | 8/2012 |
| JP | 2013136987 A | | 7/2013 |
| JP | 2013174219 A | * | 9/2013 |
| JP | 2014-190264 A | | 10/2014 |
| JP | 2014-190340 A | | 10/2014 |
| WO | 2008142549 A1 | | 11/2008 |

OTHER PUBLICATIONS

Office Action dated Jun. 17, 2016, issued in U.S. Appl. No. 14/780,013.
Notice of Allowance dated Jan. 9, 2017 in U.S. Appl. No. 14/780,013.
US Patent and Trademark Office, Notice of Allowance in U.S. Appl. No. 14/780,057, dated May 22, 2017, 42 pages.

* cited by examiner

CONTROL APPARATUS FOR INTERNAL COMBUSTION ENGINE

CROSS-REFERENCE TO RELATED APPLICATIONS

This is a national phase application based on the PCT International Patent Application No. PCT/JP2014/050141 filed Jan. 8, 2014, claiming priority to Japanese Patent Application No. 2013-066968 filed Mar. 27, 2013, the entire contents of both of which are incorporated herein by reference.

TECHNICAL FIELD

The invention relates to a control apparatus for an internal combustion engine, and more specifically to a control apparatus for an internal combustion engine having a bypass passage that connects an upstream side and a downstream side of a throttle valve in an intake passage of the internal combustion engine.

BACKGROUND ART

A conventional control apparatus for an internal combustion engine having a turbocharger is disclosed in Patent Document 1, for example. Further, Patent Document 1 proposes controlling an ignition timing in order to suppress output variation occurring when a target intake air amount determined in accordance with a required torque differs from an actual intake air amount. More specifically, the control apparatus of Patent Document 1 performs control while the internal combustion engine is operative to retard the ignition timing when the actual intake air amount overshoots, or in other word is larger than, the target intake air amount, and to advance the ignition timing when the actual intake air amount undershoots, or in other words is smaller than, the target intake air amount.

Patent Document 1: Japanese Patent Application Publication No. 2004-346917 (JP 2004-346917 A)

Patent Document 2: Japanese Patent Application Publication No. 2012-102617 (JP 2012-102617 A)

SUMMARY OF THE INVENTION

According to the control of Patent Document 1, described above, output variation occurring when the target intake air amount differs from the actual intake air amount is suppressed by advancing or retarding the ignition timing. In the case of an internal combustion engine having a turbocharger, however, the ignition timing may be set on a retardation side of minimum spark advance for best torque (MBT) in order to suppress knocking in a turbocharging region. In this case, a remaining margin to a retardation limit of the ignition timing is small. In such cases, therefore, when the actual intake air amount is larger than the target intake air amount so that it becomes necessary to reduce an output torque, it may be impossible to achieve a sufficient torque reduction simply by subjecting the ignition timing to retardation control.

Here, in the case of an internal combustion engine in which an idle speed control (ISC) passage is provided to connect an upstream side and a downstream side of a throttle valve and an ISC valve is provided in the ISC passage, the ISC valve may be opened to allow intake air to flow back to the upstream side through the ISC passage. In so doing, an amount of intake air flowing into a cylinder can be reduced, and as a result, a torque reduction can be achieved.

When control for opening the ISC valve is performed in this manner, however, the intake air flows back through the ISC passage, and therefore, depending on operating conditions, exhaust gas recirculation (EGR) gas may also flow back such that an EGR rate deviates from a target value. As a result, combustion may become unstable.

An object of the invention is to solve the problems described above by providing an improved control apparatus for an internal combustion engine, with which combustion instability occurring when a required torque is realized by controlling an ISC valve in a case where a reduction in output torque is required can be suppressed.

To achieve the object described above, a first invention is a control apparatus for an internal combustion engine including:
  a turbocharger having a compressor and a turbine;
  an intake bypass passage that connects an upstream side and a downstream side of the compressor in an intake passage of the internal combustion engine while bypassing the compressor;
  an air bypass valve that opens and closes the intake bypass passage;
  an exhaust bypass passage that connects an upstream side and a downstream side of the turbine in an exhaust passage of the internal combustion engine while bypassing the turbine;
  a wastegate valve that opens and closes the exhaust bypass passage;
  a low pressure EGR apparatus that partially recirculates exhaust gas from the exhaust passage downstream of the turbine to the intake passage upstream of the compressor;
  a throttle valve disposed in the intake passage;
  an ISC passage that connects an upstream side and a downstream side of the throttle valve in the intake passage;
  an ISC valve that is controlled to a predetermined opening in order to adjust an amount of air flowing through the ISC passage;
  control means for executing valve opening control to set an opening of the ISC valve at a larger opening than a reference opening when a required torque required by the internal combustion engine is smaller than an estimated torque that can be generated by the internal combustion engine; and
  valve closing means for closing the air bypass valve and the wastegate valve for a fixed period following completion of the valve opening control when an EGR valve of the low pressure EGR apparatus is opened during execution of the valve opening control.

Here, the "reference opening" is preferably set at a maximum opening at which the ISC valve is fully open, or a large opening in the vicinity thereof A second invention is the control apparatus for an internal combustion engine according to the first invention, wherein, when the EGR valve of the low pressure EGR apparatus is opened during execution of the valve opening control, the valve closing means closes the air bypass valve and the wastegate valve from a point at which the EGR valve is opened.

According to the first or the second invention, when the EGR valve is opened during the valve opening control performed on the ISC valve, the air bypass valve and the wastegate valve are closed. In so doing, EGR gas that flows back to the upstream side while the ISC valve is open can be caused to flow downstream of the compressor early, and as a result, an idling operation or combustion can be stabilized.

MODES FOR CARRYING OUT THE INVENTION

Embodiments of the invention will be described below with reference to the drawings. Note that identical or corresponding parts in the drawings have been allocated identical reference symbols, and description thereof has been simplified or omitted.

First Embodiment

[Configuration of First Embodiment]

Figure 1:
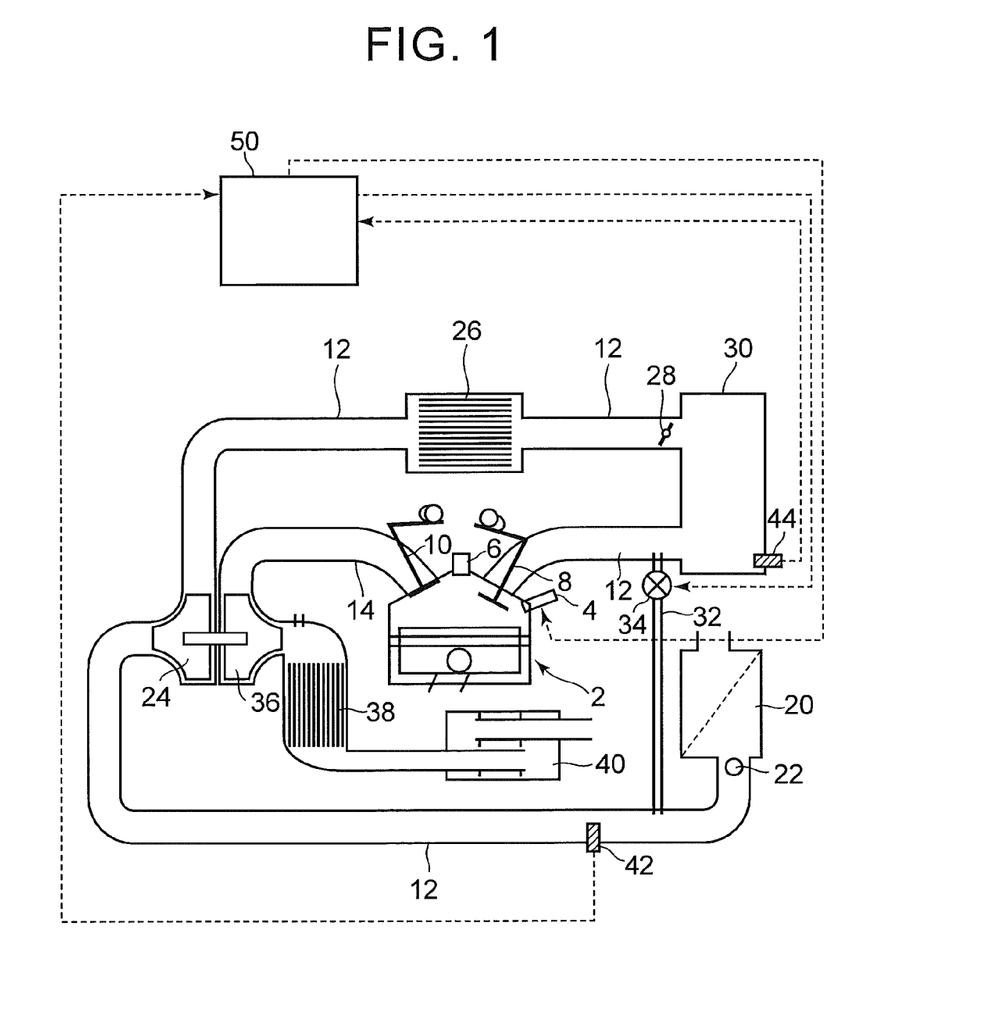
FIG. 1 is a schematic diagram illustrating an overall configuration of a system according to a first embodiment of the invention.

FIG. 1 is a schematic diagram illustrating a configuration of a system according to a first embodiment of the invention. The system according to this embodiment includes a spark ignition type internal combustion engine 2 that serves as an application subject of a control apparatus. The internal combustion engine 2 uses gasoline as fuel, and can be used favorably as a power source of a vehicle, for example. The internal combustion engine 2 can be switched between a stoichiometric combustion operation, in which an air-fuel mixture having an air-fuel ratio in the vicinity of the stoichiometric air-fuel ratio is burned, and a lean burn operation, in which an air-fuel mixture having a much leaner air-fuel ratio than the stoichiometric air-fuel ratio is burned in a predetermined lean burn operation region. Further, FIG. 1 shows only one cylinder of the internal combustion engine 2, but the internal combustion engine 2 includes a plurality of cylinders. There are no particular limitations on a number of cylinders and a cylinder layout of the internal combustion engine 2.

An in-cylinder injector 4 and a spark plug 6 are provided in each cylinder of the internal combustion engine 2. The in-cylinder injector 4 is disposed so as to inject fuel into each cylinder of the internal combustion engine 2. In the configuration shown in FIG. 1, the in-cylinder injector 4 is provided, but a port injector that injects fuel into an intake port may be used instead. An intake valve 8 and an exhaust valve 10 are provided in each cylinder of the internal combustion engine 2. A variable valve operating mechanism (not shown) is provided in the system to control opening and closing of the intake valve 8 and the exhaust valve 10.

A downstream side end portion of an intake passage 12 and an upstream side end portion of an exhaust passage 14 communicate respectively with each cylinder. An air cleaner 20 is attached to the vicinity of an inlet of the intake passage 12. An air flow meter 22 that outputs a signal corresponding to a flow rate of air taken into the intake passage 12 is provided in the vicinity of a downstream end of the air cleaner 20. A compressor 24 of the turbocharger is disposed downstream of the air flow meter 22.

An intercooler 26 that cools compressed air is provided in the intake passage 12 downstream of the compressor 24. An electronically controlled throttle valve 28 is provided downstream of the intercooler 26. A surge tank 30 is provided downstream of the throttle valve 28.

The system shown in FIG. 1 includes an ISC (Idle Speed Control) passage 32 that connects an upstream side of the throttle valve 28 and a downstream side of the throttle valve 28 in the intake passage 12. More specifically, one end of the ISC passage 32 is connected to the intake passage 12 downstream of the air cleaner 20 and upstream of the compressor 24, and another end of the ISC passage 32 is connected to the intake passage 12 downstream of the surge tank 30. An ISC valve 34 is disposed in the ISC passage 32 in order to open and close the ISC passage 32. The ISC valve 34 is a valve that varies a flow passage sectional area of the ISC passage 32 when an opening thereof is controlled to a predetermined opening, thereby adjusting a flow rate of gas flowing through the ISC passage 32.

An exhaust turbine 36 of the turbocharger is disposed in the exhaust passage 14. A catalyst 38 is provided downstream of the exhaust turbine 36 in order to purify exhaust gas, and a muffler 40 is disposed downstream thereof.

The system shown in FIG. 1 includes a first pressure sensor 42 and a second pressure sensor 44. The first pressure sensor 42 is disposed in the intake passage 12 between the air cleaner 20 and the compressor 24 in the vicinity of a connecting portion of the ISC passage 32. A first pressure P1, which is an intake air pressure in the vicinity of the connecting portion between the ISC passage 32 and the intake passage 12, is obtained by the first pressure sensor 42. The second pressure sensor 44 is disposed in the surge tank 30. A second pressure P2, which is an intake air pressure in the surge tank 30, is obtained on the basis of an output of the second pressure sensor 44.

The system shown in FIG. 1 includes an electronic control unit (ECU) 50. The control apparatus according to the invention is realized as a function of the ECU 50. Various sensors for detecting operating conditions of the internal combustion engine 2, such as the air flow meter 22 and the first and second pressure sensors 42, 44 described above, are connected to the ECU 50. Further, various actuators for controlling the operating conditions of the internal combustion engine 2, such as the throttle valve 28, the in-cylinder injector 4, and the spark plug 6 described above, are connected to the ECU 50. The ECU 50 controls the operating conditions of the internal combustion engine 2 by executing a control program stored in a memory in advance in accordance with parameters relating to the operating conditions of the internal combustion engine, which are obtained from the outputs of the respective sensors.

[Outline of ISC Valve Full Opening Control According to this Embodiment]

Control executed by the control apparatus according to this embodiment includes control relating to an open/closed condition of the ISC valve 34. In this control, the control apparatus obtains a required torque and a predicted generated torque (also referred to as an estimated torque hereafter), which is a torque that can be generated by the internal combustion engine. The required torque and the predicted generated torque are calculated using conventional methods, and there are no limitations here on the calculation methods. Further, the invention is not limited to a configuration in which the required torque and the predicted generated torque are calculated directly by the control apparatus according to this embodiment, and instead, the required torque and the predicted generated torque may be input into the control apparatus from an upper order system.

The control apparatus performs control to open the ISC valve 34 fully on condition that the obtained predicted generated torque is larger than the required torque and the second pressure P2 is higher than the first pressure P1. By fully opening the ISC valve 34 when the second pressure P2 on the downstream side of the intake passage 12 is higher than the first pressure P1 on the upstream side, intake air can be caused to flow back to the upstream side, enabling a reduction in an internal pressure of the surge tank 30. As a result, torque variation occurring when the predicted generated torque exceeds the required torque is suppressed. Note that in the following embodiments, valve opening control in which the ISC valve 34 is fully opened when the above condition is satisfied (i.e. when the predicted generated torque is larger than the required torque and the second pressure P2 is higher than the first pressure P1) will also be referred to as "ISC valve full opening control". Further, the condition will also be referred to as an "ISC valve full opening condition".

Figure 2:
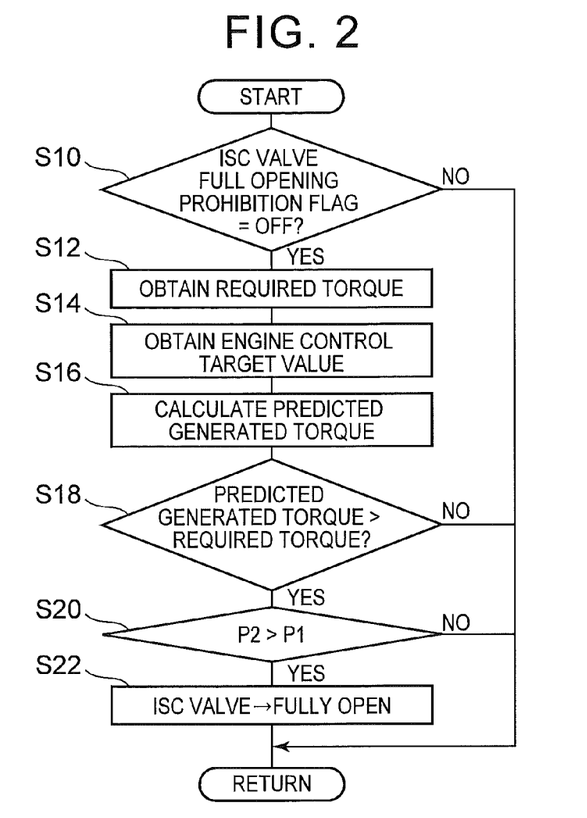
FIG. 2 is a flowchart illustrating a control routine executed by a control apparatus in the first embodiment of the invention.

FIG. 2 is a flowchart illustrating a control routine executed by the control apparatus in the first embodiment of the invention. The routine shown in FIG. 2 is executed repeatedly at fixed time intervals while the internal combustion engine 2 is operative. In the routine of FIG. 2, first, a determination is made as to whether or not an ISC valve full opening prohibition flag is OFF (S10). The ISC valve full opening prohibition flag is switched ON and OFF by processing to be described below, and while the flag is ON, the ISC valve full opening control is prohibited. When the ISC valve full opening prohibition flag is not found to be OFF in step S10, therefore, the current processing is terminated.

When the ISC valve full opening prohibition flag is found to be OFF in step S10, on the other hand, next, the required torque is obtained (S12). Next, engine control target values are obtained (S14). The engine control target values include, for example, currently set values of a target opening of the throttle valve 28, a target ignition timing, a target opening of the ISC valve 34, and so on. Next, the predicted generated torque is calculated in accordance with the control target values (S16).

Next, a determination is made as to whether or not the predicted generated torque calculated in step S16 is larger than the required torque obtained in step S12 (S18). When the predicted generated torque is not found to be larger than the required torque in step S18, the current processing is terminated.

When the predicted generated torque is found to be larger than the required torque in step S18, on the other hand, next, a determination is made as to whether or not the second pressure P2 is higher than the first pressure P1 (S20). When the second pressure P2 is not found to be higher than the first pressure P1 in step S20, the current processing is terminated.

When the second pressure P2 is found to be higher than the first pressure P1 in step S20, on the other hand, the ISC valve 34 is fully opened (S22). By fully opening the ISC valve 34 while the second pressure P2 is higher than the first pressure P1, a part of the intake air flows back through the ISC passage 32 from the part of the intake passage 12 on the downstream side of the surge tank 30 to the upstream side of the intake passage 12. As a result, the internal pressure of the surge tank decreases such that torque is suppressed. The current processing is then terminated.

[Outline of Lean Burn Operation Prohibition Control According to this Embodiment]

Incidentally, the internal combustion engine 2 according to this embodiment is capable of a lean burn operation. To ensure that lean burn is performed with stability in an internal combustion engine capable of a lean burn operation, an intake port is designed in an optimal shape for strengthening a swirl flow and a tumble flow generated in the cylinder. During execution of the ISC valve full opening control, however, intake air flows back to the upstream side through the ISC passage 32. Therefore, during the ISC valve full opening control, an intake air flow in the intake passage 12 varies greatly. As a result, the swirl flow and the tumble flow generated in the cylinder may be insufficient, leading in particular to a reduction in a lean burn limit or instability during the lean burn operation.

Figure 3:
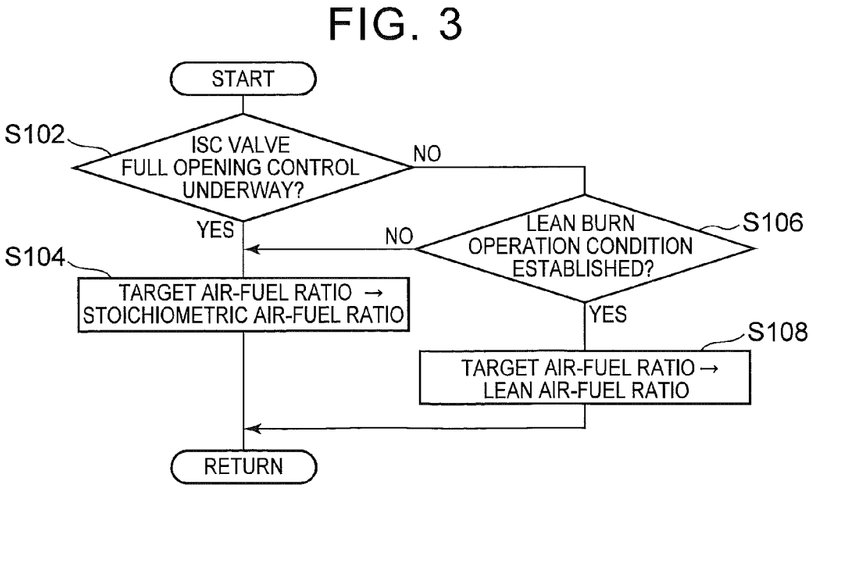
FIG. 3 is a flowchart illustrating a control routine executed by the control apparatus in the first embodiment of the invention.

Hence, the control apparatus according to this embodiment executes control to prohibit the lean burn operation during the ISC valve full opening control. FIG. 3 is a flowchart illustrating a control routine executed by the control apparatus in the first embodiment of the invention. The routine shown in FIG. 3 is executed repeatedly at fixed time intervals while the internal combustion engine 2 is operative. In the routine of FIG. 3, first, a determination is made as to whether or not the ISC valve full opening control is underway (S102). When the ISC valve full opening control is found to be underway in step S102, a target air-fuel ratio is set at the stoichiometric air-fuel ratio (S104). As a result, the lean burn operation is prohibited. The current processing is then terminated.

When the ISC valve full opening control is not found to be underway in step S102, on the other hand, a determination is made in S106 as to whether or not a lean burn operation condition is currently established. The lean burn operation condition is stored in advance in the control apparatus. More specifically, the lean burn operation condition is established when, for example, an engine rotation speed of the internal combustion engine 2 is no higher than a predetermined rotation speed or the like.

When the lean burn operation condition is not found to be established in step S106, the processing advances to step S104, where the target air-fuel ratio is set at the stoichiometric air-fuel ratio. The current processing is then terminated.

When the lean burn operation condition is found to be established in step S106, on the other hand, next, the target air-fuel ratio is set at a predetermined lean air-fuel ratio (S108). The current processing is then terminated.

By performing the processing described above, the lean burn operation is prohibited and a stoichiometric combustion operation is executed while the ISC valve full opening control is underway. As a result, combustion during the ISC valve full opening control can be stabilized.

Outline of ISC Valve Full Opening Control Prohibition Control According to this Embodiment Furthermore, during the lean burn operation, the control apparatus according to this embodiment prohibits the ISC valve full opening control. In other words, when the lean burn operation is underway, the ISC valve full opening control is not performed even in an operating condition where the ISC valve full opening condition is established.

Figure 4:
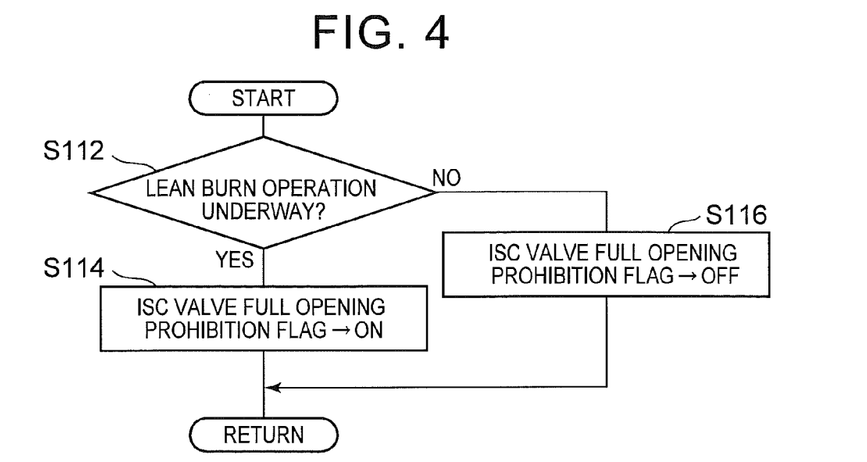
FIG. 4 is a flowchart illustrating a control routine executed by the control apparatus in the first embodiment of the invention.

FIG. 4 is a flowchart illustrating a control routine executed by the control apparatus in the first embodiment of the invention. The routine shown in FIG. 4 is executed repeatedly at fixed time intervals while the internal combustion engine 2 is operative. In the routine of FIG. 4, first, a determination is made as to whether or not the lean burn operation is underway (S112).

When the lean burn operation is found to be underway in step S112, next, the ISC valve full opening prohibition flag is switched ON (S114). The ISC valve full opening prohibition flag is the flag used to determine in step S10 of the routine shown in FIG. 2, described above, whether or not the ISC valve full opening control can be executed, and when the flag is switched ON, the ISC valve full opening control according to the routine shown in FIG. 2 is prohibited. The current processing is then terminated. In this case, the ISC valve 34 is controlled in accordance with a control program for controlling the ISC valve 34 under normal conditions, which is stored separately in the ECU 50. As a result of this processing, the ISC valve full opening control is prohibited during the lean burn operation. Note, however, that the ISC valve 34 may be opened to a fully opened condition in response to a normal control flag even during the lean burn operation.

When the lean burn operation is not found to be currently underway in step S112, on the other hand, the ISC valve full opening prohibition flag is switched OFF (S116). As a result, execution of the routine shown in FIG. 2 is permitted so that when the ISC valve full opening condition is determined to be established during the routine of FIG. 2, the ISC valve 34 is fully opened. The current processing is then terminated.

According to this embodiment, as described above, a switch to the lean burn operation is prohibited during execution of the ISC valve full opening control, and the ISC valve full opening control is prohibited during the lean burn operation. As a result, torque variation outside the lean burn operation region can be suppressed while securing stable combustion in the lean burn operation region.

In this embodiment, a case in which the ISC valve 34 is fully opened, or in other words the opening of the ISC valve 34 is set at a maximum opening, when the ISC valve full opening condition is established was described. The invention is not limited to this configuration, however, and instead, the opening of the ISC valve 34 may be increased beyond a predetermined reference opening. Here, the reference opening may be set appropriately at any opening large enough to ensure that when the ISC valve is opened, the intake air flows back early, enabling a reduction in the generated torque. This applies likewise to the other embodiments.

Further, a case in which the system according to this embodiment includes the first pressure sensor 42 and the second pressure sensor 44 so that the first pressure P1 and the second pressure P2 are obtained on the basis of the outputs of these sensors was described. However, the invention may be configured not to include one or both of the first pressure sensor 42 and the second pressure sensor 44. In this case, estimated values of pressure in respective parts may be used as the first pressure P1 and the second pressure P2. This applies likewise to the other embodiments.

Furthermore, in this embodiment, a case in which the control apparatus prohibits a switch to the lean burn operation during the ISC valve full opening control and prohibits execution of the ISC valve full opening control during the lean burn operation by executing the routines in both FIG. 3 and FIG. 4 was described. However, the invention is not limited to a configuration in which both control routines are executed, and either one of the control routines may be executed alone. This applies likewise to the other embodiments.

Second Embodiment

Figure 5:
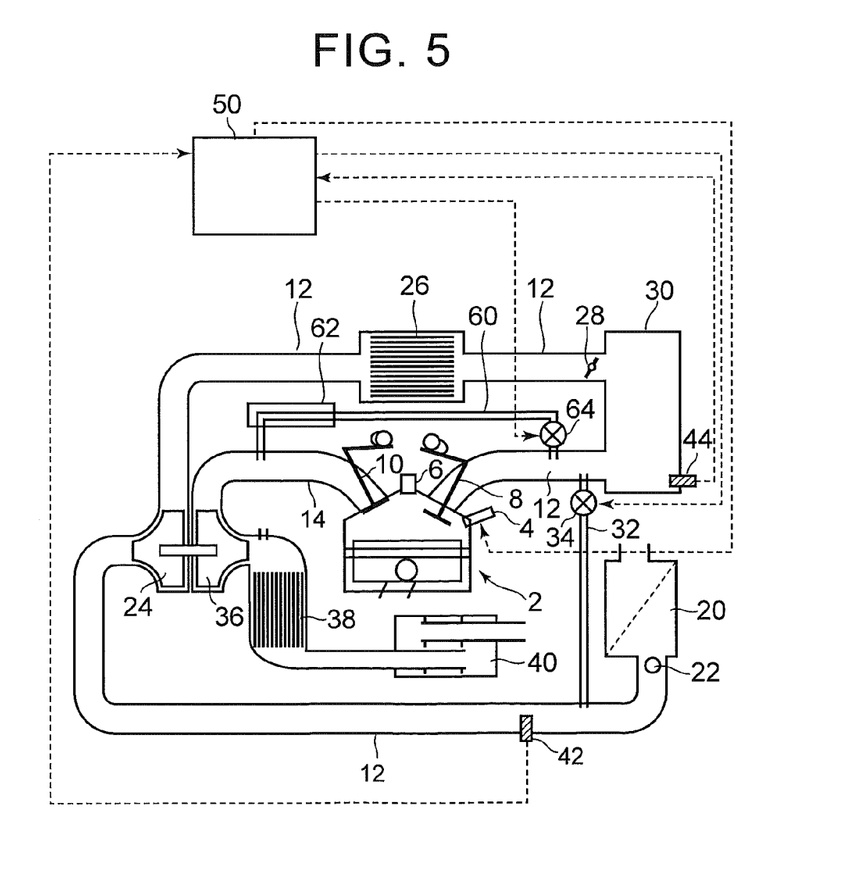
FIG. 5 is a schematic diagram illustrating an overall configuration of a system according to a second embodiment of the invention.

FIG. 5 is a view illustrating a system according to a second embodiment of the invention. As shown in FIG. 5, the system of FIG. 5 includes a high pressure EGR apparatus, but is otherwise configured identically to the system of FIG. 1. More specifically, the system of FIG. 5 includes, in addition to the system of FIG. 1, a high pressure EGR (HPL-EGR: High Pressure Loop Exhaust Gas Recirculation) apparatus that recirculates a part of the exhaust gas from the exhaust passage 14 to the intake passage 12 as EGR gas.

The high pressure EGR apparatus includes a high pressure EGR pipe 60, and a high pressure EGR cooler 62 and a high pressure EGR valve 64 provided in the high pressure EGR pipe 60. One end of the high pressure EGR pipe 60 is connected to the exhaust passage 14 on the upstream side of the exhaust turbine 36, and another end is connected to the intake passage 12 between the surge tank 30 and an intake manifold (not shown). By adjusting an opening of the high pressure EGR valve 64, the high pressure EGR valve 64 can modify a flow passage sectional area of the high pressure EGR pipe 60. In other words, a flow rate of EGR gas flowing through the high pressure EGR pipe 60 is controlled by controlling the opening of the high pressure EGR valve 64.

The control apparatus controls the opening of the EGR valve 64 by issuing a control signal with which to control the opening of the high pressure EGR valve 64 in accordance with a control program stored therein in advance. Incidentally, when the ISC valve full opening control is executed while high pressure EGR is underway, unpurified EGR gas may flow back to the air cleaner 20 side through the ISC passage 32, and either remain in the air cleaner 20 or escape into the atmosphere.

In this embodiment, therefore, the control apparatus includes control for prohibiting the ISC valve full opening control when the high pressure EGR valve is open. More specifically, when a command to execute the ISC valve full opening control is issued while the high pressure EGR valve 64 is open, the control apparatus according to the second embodiment executes the ISC valve full opening control after fully closing the high pressure EGR valve 64.

Figure 6:
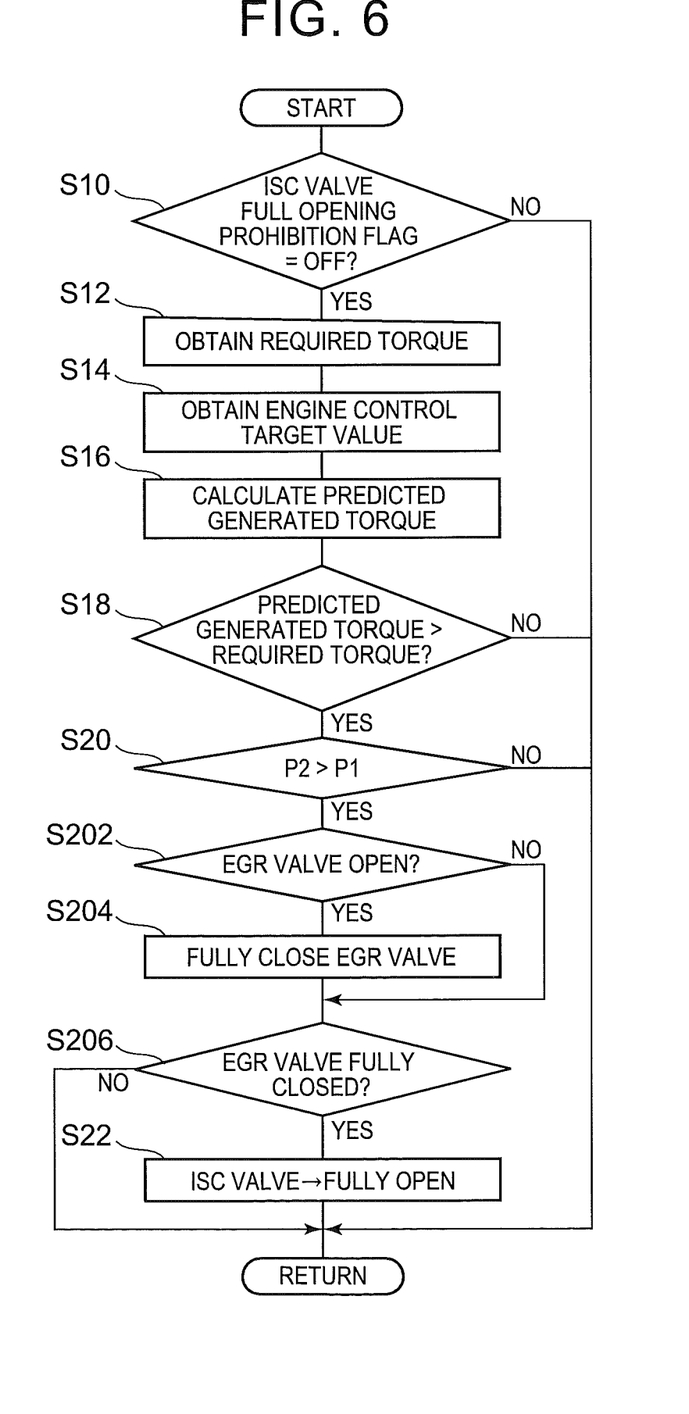
FIG. 6 is a flowchart illustrating a control routine executed by a control apparatus in the second embodiment of the invention.

FIG. 6 is a flowchart illustrating a control routine executed by the control apparatus in the second embodiment of the invention. The routine shown in FIG. 6 is executed in place of the routine shown in FIG. 2, and is executed repeatedly at fixed time intervals. The routine of FIG. 6 is identical to the routine of FIG. 2 except that processing of steps S202 to S206 is executed between the processing of step S20 and the processing of step S22 in the routine of FIG. 2.

In the routine shown in FIG. 6, when the ISC valve full opening condition is found to be established in the processing up to step S20, first, following the processing of S20, a determination is made as to whether or not the high pressure EGR valve 64 is open (S202).

When it is determined in step S202 that the high pressure EGR valve 64 is open, next, a control signal is issued to fully close the high pressure EGR valve 64 (S204). Next, a determination is made as to whether or not the high pressure EGR valve 64 is fully closed (S206). In other words, a determination is made as to whether or not the high pressure EGR valve 64 has actually been fully closed in response to the control command issued in step S204. When the high pressure EGR valve 64 is not found to be closed in step S206, the current processing is terminated as is. In other words, the current processing is terminated without fully opening the ISC valve 34.

When, on the other hand, the high pressure EGR valve 64 is found to be fully closed in step S206 or it is determined in step S202 that the EGR valve is not open, next, the ISC valve full opening control is executed (S22). The current processing is then terminated.

According to this embodiment, as described above, the ISC valve full opening control is prohibited while the high pressure EGR valve 64 is open, and when the ISC valve full opening control condition is established, the ISC valve full opening control is executed after closing the high pressure EGR valve 64. In so doing, a backflow of unpurified EGR gas can be suppressed, and as a result, combustion instability caused by an increase in an EGR rate occurring when EGR gas remains in the air cleaner 20 can be suppressed. Furthermore, a situation in which back-flowing unpurified EGR gas is discharged to the outside through the intake port can be suppressed, and as a result, an increase in emissions can be prevented.

In this embodiment, a case in which the control relating to the lean burn operation, described in the first embodiment, and the control relating to the high pressure EGR valve according to this embodiment are performed in combination was described. More specifically, according to the routine of FIG. 6, the ISC valve full opening prohibition flag is switched ON during the lean burn operation in the routine of FIG. 4, whereby execution of the ISC valve full opening control is prohibited in accordance with the processing of S10, and execution of the ISC valve full opening control is prohibited while the EGR valve 64 is open in accordance with the processing of S202 to S206. Further, by incorporating the routine of FIG. 3, the lean burn operation is prohibited during the ISC valve full opening control. This applies likewise to the other embodiments.

The invention is not limited to this configuration, however, and one or both of the control for prohibiting the ISC valve full opening control during the lean burn operation and the control for prohibiting the lean burn operation during the ISC valve full opening control, as described in the first embodiment, may be omitted. In this case, the determination as to whether or not the ISC valve full opening prohibition flag is OFF, performed in step S10 of the routine shown in FIG. 6, and/or the routine shown in FIG. 3, for example, may be omitted. This applies likewise to the other embodiments.

Third Embodiment

Figure 7:
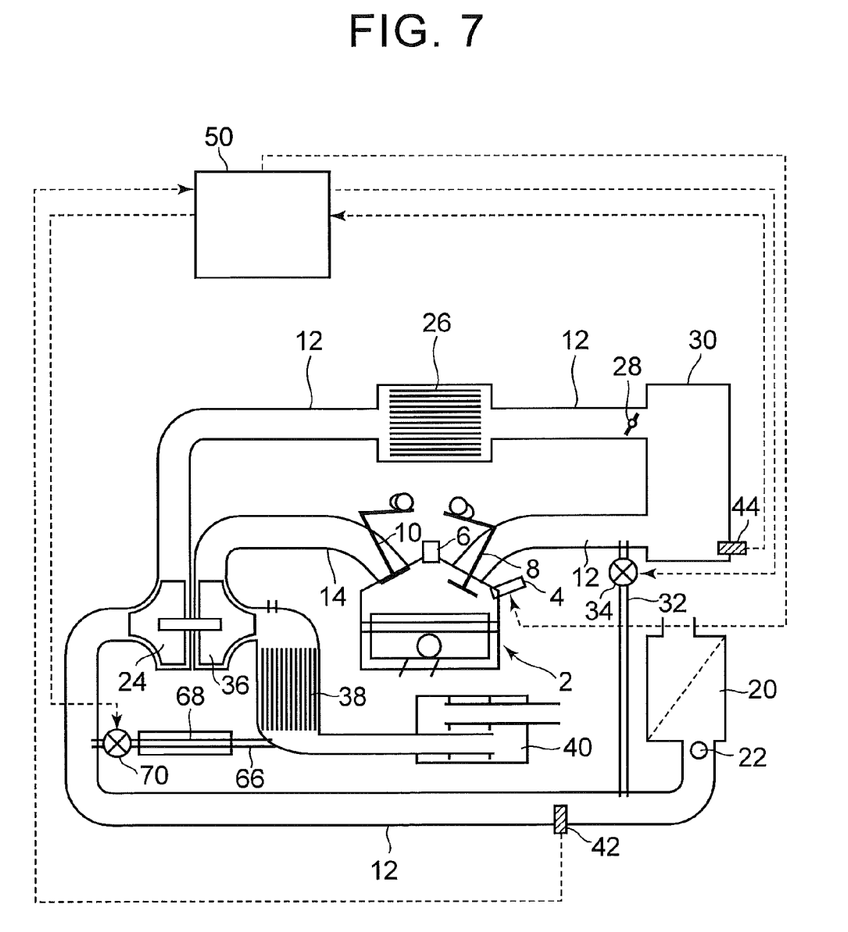
FIG. 7 is a schematic diagram illustrating an overall configuration of a system according to a third embodiment of the invention.

FIG. 7 is a view illustrating an overall configuration of a system according to a third embodiment of the invention. The system shown in FIG. 7 includes a low pressure EGR apparatus, but is otherwise identical to the system shown in FIG. 1. The system of FIG. 7 includes a low pressure EGR (LPL-EGR: Low Pressure Loop-Exhaust Gas Recirculation) apparatus.

In the system of FIG. 7, the low pressure EGR apparatus includes a low pressure EGR pipe 66, and a low pressure EGR cooler 68 and a low pressure EGR valve 70 provided in the low pressure EGR pipe 66. One end of the low pressure EGR pipe 66 is connected to the exhaust passage 14 on the downstream side of the catalyst 38, and another end is connected to the intake passage 12 on the upstream side of the compressor 24. By adjusting an opening of the low pressure EGR valve 70, the low pressure EGR valve 70 can modify the flow passage sectional area of the low pressure EGR pipe 66. In other words, the flow rate of EGR gas flowing through the low pressure EGR pipe 66 is controlled by controlling the opening of the low pressure EGR valve 70.

In the case of the low pressure EGR apparatus, as shown in FIG. 7, one end of the low pressure EGR pipe 66 is connected to the intake passage 12 on the upstream side of the compressor 24. Therefore, when EGR gas recirculation by the low pressure EGR apparatus is stopped, EGR gas remains in the intake passage 12 after the low pressure EGR valve 70 is closed for a longer time than in the case of the high pressure EGR apparatus. Hence, when EGR gas remains in the intake passage 12 upon execution of the ISC valve full opening control, even though the low pressure EGR valve 70 is closed, the remaining EGR gas may flow back to the air cleaner 20 side and escape to the outside.

In this embodiment, therefore, control is performed to estimate a remaining amount of EGR gas in the intake passage 12 after closing the low pressure EGR valve 70, and allow the ISC valve to be fully opened when no remaining EGR gas is found. Note that here, the remaining amount of EGR gas is determined in accordance with a pipe capacity downstream of the low pressure EGR valve 70, the flow rate of the intake air, and so on.

Figure 8:
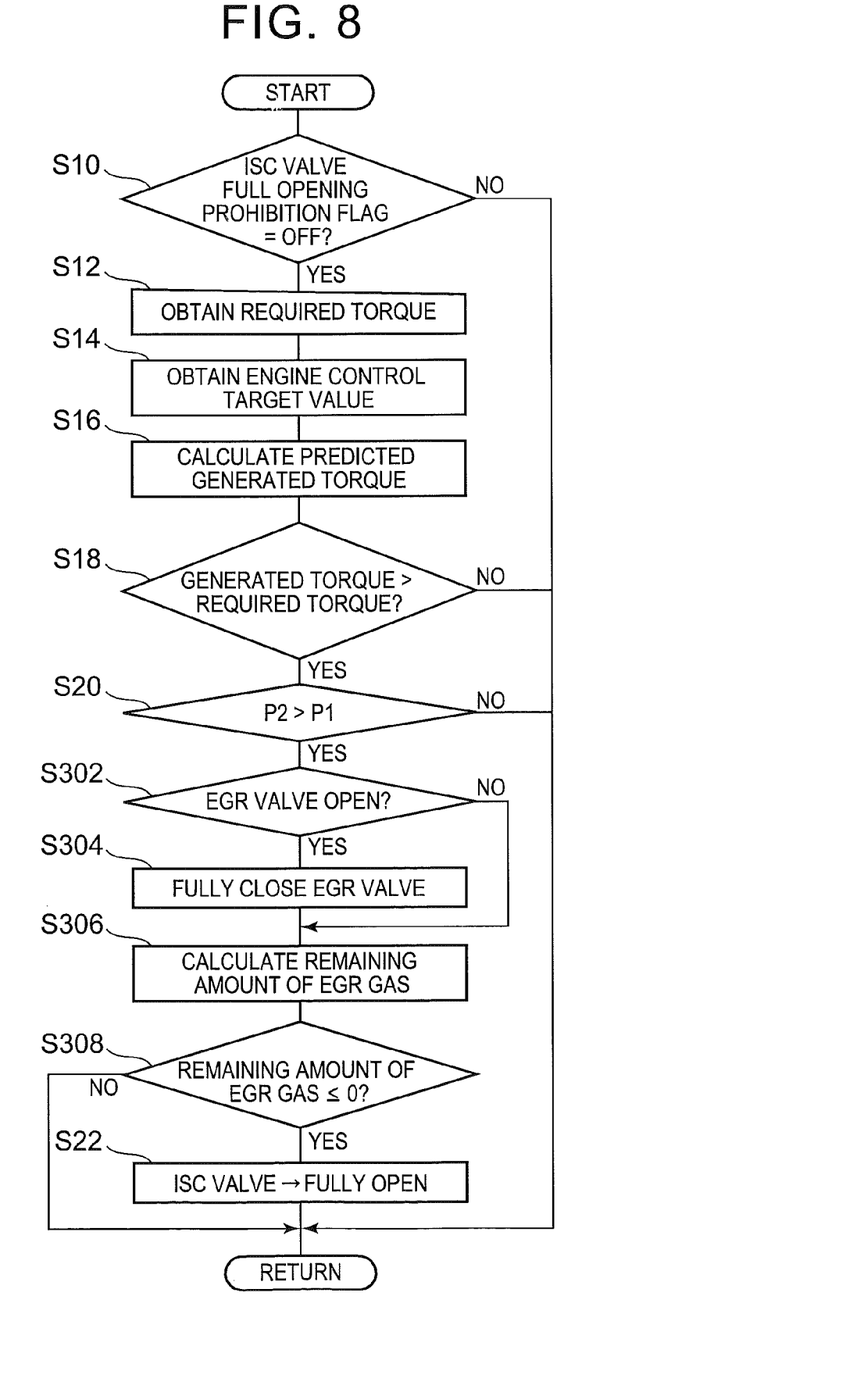
FIG. 8 is a flowchart illustrating a control routine executed by a control apparatus in the third embodiment of the invention.

FIG. 8 is a flowchart illustrating a control routine executed by the control apparatus in the third embodiment of the invention. The routine shown in FIG. 8 is executed in place of the routine shown in FIG. 6, and is executed repeatedly at fixed time intervals. The routine of FIG. 8 is identical to the routine of FIG. 2 except that processing of steps S302 to S308 is executed between steps S20 and S22.

In the routine shown in FIG. 8, when the ISC valve full opening condition is found to be established in the processing up to step S20, next, a determination is made as to whether or not the low pressure EGR valve 70 is open (S302). When the low pressure EGR valve 70 is found to be open in step S302, next, the low pressure EGR valve 70 is fully closed (S304). The control apparatus closes the low pressure EGR valve 70 by issuing a predetermined control signal.

After the low pressure EGR valve 70 is fully closed in step S304, or when the low pressure EGR valve 70 is not found to be open in step S302, next, the remaining amount of EGR gas is calculated (S306). Here, the remaining amount of EGR gas is an amount of EGR gas remaining in the intake passage 12 at the time of calculation, and is determined in accordance with an elapsed time following closure of the low pressure EGR valve 70, the intake air amount, the capacity of the intake passage 12 downstream of the low pressure EGR valve 70, and so on using a calculation formula or the like stored in the control apparatus in advance.

Next, a determination is made as to whether or not the remaining amount of EGR gas calculated in step S306 is equal to or smaller than zero (S308). When the remaining amount of EGR gas is not found to be equal to or smaller than zero, the current processing is terminated as is. In other words, although the ISC valve full opening control execution condition is found to be established in the processing up to S20, it is determined that EGR gas remains in the intake passage 12, and therefore the current processing is terminated as is without fully opening the ISC valve. Thereafter, the routine of FIG. 8 is repeated.

When the remaining amount of EGR gas is not found to be equal to or smaller than zero in step S308, on the other hand, next, the ISC valve 34 is fully opened (S22). The current processing is then terminated.

According to this embodiment, as described above, when the low pressure EGR apparatus is used, full opening of the ISC valve is prohibited as long as EGR gas remains, even after the low pressure EGR valve 70 is closed. Therefore, a situation in which EGR gas flows back from the ISC passage 32 and escapes to the outside through the air cleaner 20 can be prevented more reliably.

In this embodiment, a case in which the low pressure EGR apparatus is provided alone as an EGR apparatus was described. The invention is not limited to this configuration, however, and the high pressure EGR apparatus illustrated in FIG. 5 may also be provided. In this case, control relating to high pressure EGR may be executed in accordance with the routine shown in FIG. 6, as described in the second embodiment. Further, the remaining amount of EGR gas following valve closure may be calculated as described in the routine of FIG. 8 likewise in relation to the high pressure EGR apparatus so that the ISC valve is fully opened at the point where the remaining amount reaches zero. This applies likewise to the other embodiments.

Furthermore, likewise in the third embodiment, a case in which the control relating to the lean burn operation, described in the first embodiment, is combined with the control relating to the low pressure EGR valve according to this embodiment was described. More specifically, according to the routine of FIG. 8, execution of the ISC valve full opening control is prohibited during the lean burn operation in accordance with the processing of S10, and execution of the ISC valve full opening control is prohibited while EGR gas remains in accordance with the processing of S302 to S308. Further, by incorporating the routine of FIG. 3, the lean burn operation is prohibited during the ISC valve full opening control. This applies likewise to the other embodiments.

The invention is not limited to this configuration, however, and one or both of the control for prohibiting the ISC valve full opening control during the lean burn operation and the control for prohibiting the lean burn operation during the ISC valve full opening control, as described in the first embodiment, may be omitted. In this case, the determination as to whether or not the ISC valve full opening prohibition flag is OFF, performed in step S10 of the routine shown in FIG. 8, and/or the routine shown in FIG. 3, for example, may be omitted. This applies likewise to the other embodiments.

Fourth Embodiment

Figure 9:
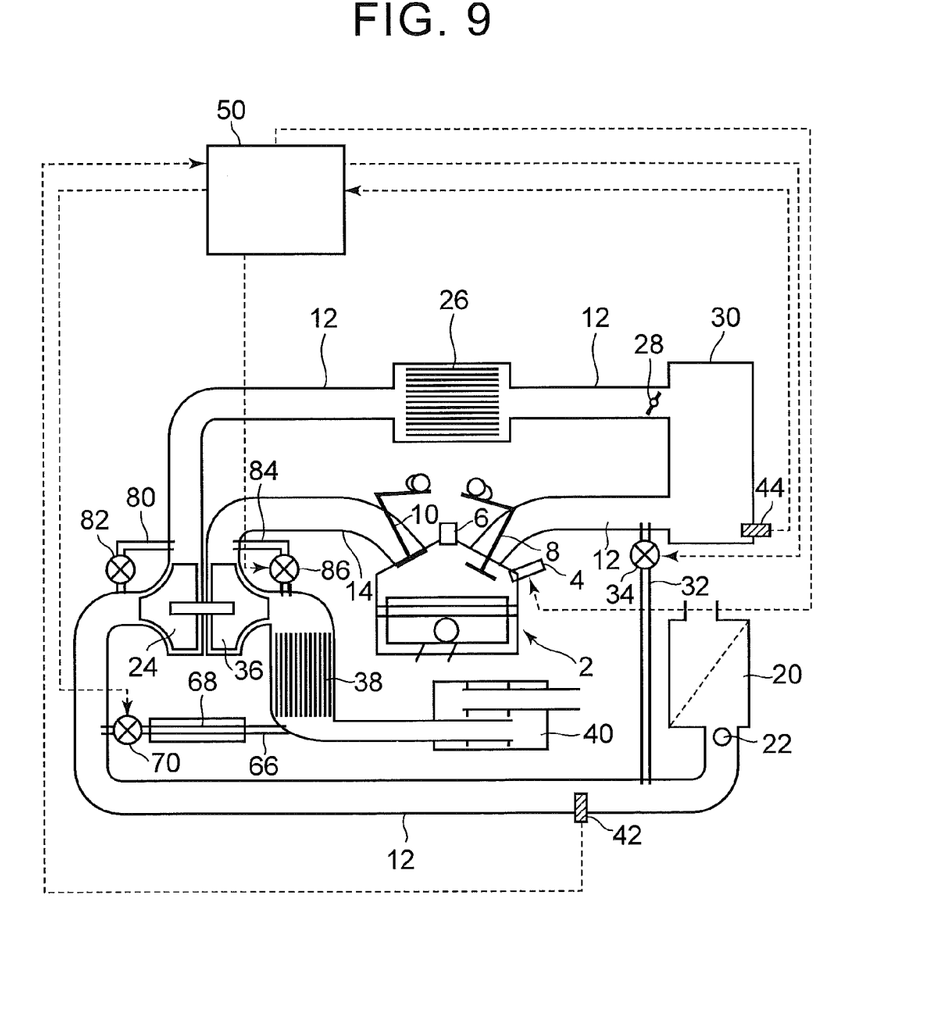
FIG. 9 is a schematic diagram illustrating an overall configuration of a system according to a fourth embodiment of the invention.

FIG. 9 is a view illustrating an overall configuration of a system according to a fourth embodiment of the invention. In the system shown in FIG. 9, an intake bypass passage 80 that bypasses the compressor 24 is provided between the low pressure EGR plate 66 and the intercooler 26 in the intake passage 12. An upstream side end portion of the intake bypass passage 80 is connected to the intake passage 12 between a connecting portion connected to the low pressure EGR pipe 66 and an inlet of the compressor 24, and a downstream side end portion is connected between an outlet of the compressor and the intercooler 26. An air bypass valve (also abbreviated to "ABV" hereafter) 82 is provided in the intake bypass passage 80. By modifying an opening of the ABV 82, the ABV 82 can modify a flow passage sectional area of the intake bypass passage 80. In other words, an amount of intake air flowing through the intake bypass passage 80 so as to bypass the compressor 24 is adjusted by controlling the opening of the ABV 82.

An exhaust bypass passage 84 that connects an inlet side and an outlet side of the exhaust turbine 36 while bypassing the exhaust turbine 36 is connected to the exhaust passage 14. One end of the exhaust bypass passage 84 is connected to the exhaust passage 14 upstream of the inlet of the exhaust turbine 36, and another end is connected between the outlet of the exhaust turbine 36 and the catalyst 38. A wastegate valve (also abbreviated to "WGV" hereafter) 86 is provided midway in the exhaust bypass passage 84 in order to open and close the exhaust bypass passage 84. By modifying an opening of the WGV 86, the WGV 86 can modify a flow passage sectional area of the exhaust bypass passage 84. In other words, an amount of exhaust gas flowing through the exhaust bypass passage 84 so as to bypass the exhaust turbine 36 is adjusted by controlling the opening of the WGV 86.

In the system of the fourth embodiment, the ISC valve full opening control is not prohibited even when the low pressure EGR valve 70 of the low pressure EGR apparatus is open. In the fourth embodiment, when the ISC valve full opening control is executed while the low pressure EGR valve 70 is open, control is executed to close the ABV 82 and the WGV 86 fully for a fixed period following completion of the ISC valve full opening control. In so doing, a turbocharging pressure can be increased, and as a result, the EGR gas remaining on the air cleaner 20 side can be suctioned downstream of the compressor 24 early. Hence, the EGR gas remaining in the intake passage 12 can be sent to the downstream side early, and as a result, idling can be stabilized early.

Figure 10:
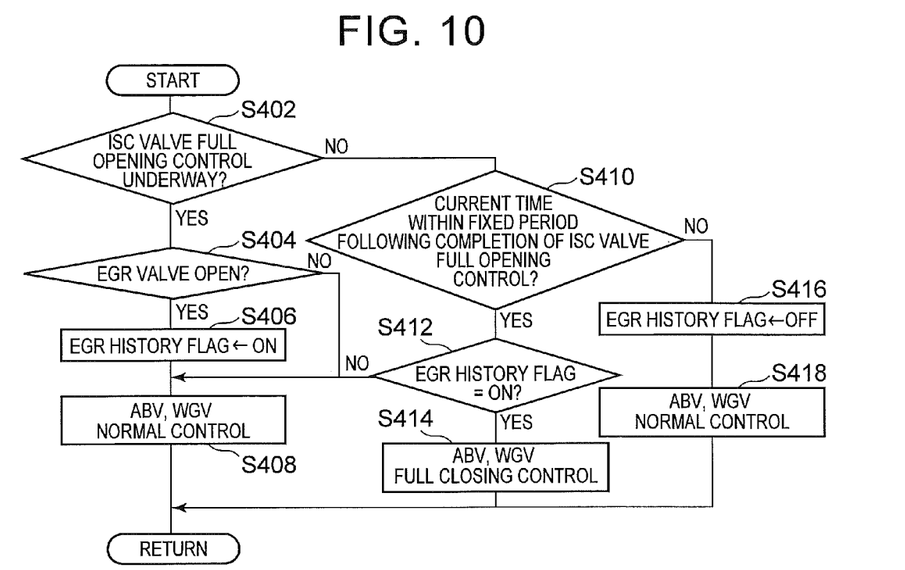
FIG. 10 is a flowchart illustrating a control routine executed by a control apparatus in the fourth embodiment of the invention.

FIG. 10 is a flowchart illustrating a control routine executed by the control apparatus in the fourth embodiment of the invention. In this embodiment, the control apparatus executes the respective routines of FIG. 2 and t FIG. 10 repeatedly at fixed time intervals while the internal combustion engine 2 is operative.

In the routine of FIG. 10, first, a determination is made as to whether or not the ISC valve full opening control is underway (S402). In other words, a determination is made as to whether or not the ISC valve full opening condition has been established and the ISC valve 34 been fully opened in the processing up to step S20 and the processing of step S22, respectively, in the routine of FIG. 2.

When the ISC valve full opening control is found to be underway in step S402, next, a determination is made as to whether or not the low pressure EGR valve 70 is open (S404). When the low pressure EGR valve 70 is found to be open in step S404, next, an EGR history flag is switched ON (S406). The EGR history flag is a flag used to determine whether or not the low pressure EGR valve 70 has a history of being opened during execution of the ISC valve full opening control. The EGR history flag is switched ON when the low pressure EGR valve 70 is opened even once during a single iteration of the ISC valve full opening control, and switched OFF after the ABV 82 and the WGV 86 have been fully closed for the fixed period following completion of that ISC valve full opening control in processing to be described below.

After the EGR history flag is switched ON in step S406, or when the low pressure EGR valve 70 is not found to be open in step S404, the ABV 82 and the WGV 86 are set in a normal control mode so as to be controlled in accordance with a control program used during normal operations, which is stored separately in the control apparatus (S408). The current processing is then terminated.

When the ISC valve full opening control is not found to be underway in step S402, on the other hand, next, in step S410, a determination is made as to whether or not a current time is within a fixed period following a completion point of the previous ISC valve full opening control (S410). The fixed period is stored in the control apparatus in advance. The fixed period is set appropriately on the basis of an optimum time for closing the ABV 82 and the WGV 86, and is determined by experiment, simulation, or the like.

When the current time is found to be within the fixed period following the completion point of the ISC valve full opening control in step S410, next, a determination is made as to whether or not the EGR history flag is ON (S412). When the EGR history flag is not found to be ON in step S412, the processing advances to step S408, where opening control of the ABV 82 and the WGV 86 is performed in the normal control mode in accordance with the control program used during normal operations. The current processing is then terminated.

When the EGR history flag is found to be ON, on the other hand, the ABV 82 and the WGV 86 are fully closed (S414). As a result, the turbocharging pressure is intensified so that the EGR gas remaining in the air cleaner 20 can be suctioned to the downstream side of the compressor early. The current processing is then terminated, whereupon the routine of FIG. 10 is repeated from step S402.

When the current time is not found to be within the fixed period following completion of the ISC valve full opening control in the processing of step S410, on the other hand, it is determined that at least the fixed period has elapsed following completion of the ISC valve full opening control. In this case, the EGR history flag is switched OFF in step S416. As a result, the opening history of the low pressure EGR valve during the current ISC valve full opening control is cleared.

After the EGR history flag is switched OFF in step S416, the ABV 82 and the WGV 86 are set in the normal control mode (S418). As a result, the full closing control executed on the ABV 82 and the WGV 86 in S414 is canceled, and the ABV 82 and the WGV 86 are controlled in accordance with the control program used during normal operations. The current processing is then terminated.

According to the fourth embodiment, as described above, the ABV 82 and the WGV 86 are fully closed when the low pressure EGR valve is opened while the ISC valve is fully open. In so doing, the EGR gas can be suctioned to the downstream side of the compressor early, and as a result, an idling operation can be stabilized early. Moreover, this control is not limited to idling, and since the remaining EGR gas can be caused to flow early, early stabilization of the EGR control can also be achieved.

Note that in this embodiment, a case in which the ABV 82 and the WGV 86 are fully closed for the fixed period following completion of the ISC valve full opening control when the low pressure EGR valve 70 has a history of being opened during the ISC valve full opening control. The invention is not limited to this configuration, however, and when the low pressure EGR valve 70 is found to be open during the ISC valve full opening control, control may be performed to close the ABV 82 and the WGV 86 immediately, even while the ISC valve full opening control is underway.

Figure 11:
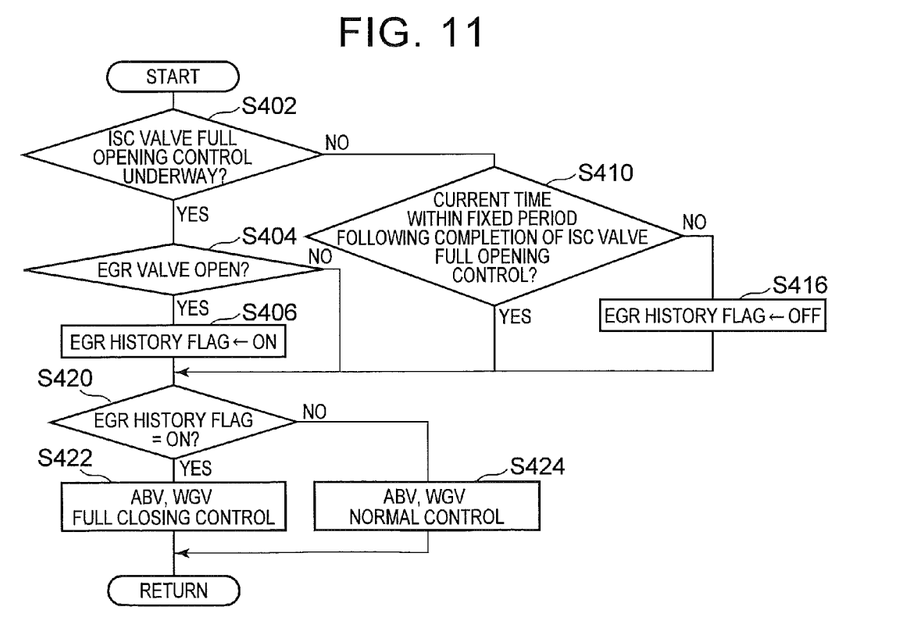
FIG. 11 is a flowchart illustrating a control routine executed by the control apparatus in the fourth embodiment of the invention.

A routine performed in this case will now be described using FIG. 11. FIG. 11 is a flowchart illustrating a control routine executed by the control apparatus in another example of control according to the fourth embodiment of the invention.

The routine shown in FIG. 11 is executed repeatedly at fixed time intervals in place of the routine shown in FIG. 10. In the routine of FIG. 11, when the current time is found to be within the fixed period following completion of the ISC valve full opening control in step S410 of the routine of FIG. 10 after the EGR history flag is switched ON in step S406, or after the EGR history flag is switched OFF in step S416, next, a determination is made in step S420 as to whether or not the EGR history flag is ON. When the EGR history flag is found to be ON in step S420, the ABV 82 and the WGV 86 are fully closed (S422). When the EGR history flag is not found to be ON, on the other hand, the ABV 82 and the WGV 86 are controlled in accordance with the control program used during normal operations (S424).

In other words, according to the routine shown in FIG. 11, when the low pressure EGR valve is opened even once between the start and the end of the ISC valve full opening control, the ABV 82 and the WGV 86 are controlled to be fully closed for the fixed period following completion of the ISC valve full opening control. On the other hand, when the EGR valve is not opened even once during the ISC valve full opening control and after the fixed period elapses following completion of the ISC valve full opening control, the ABV 82 and the WGV 86 are controlled as normal.

As shown in FIG. 11, when the low pressure EGR valve 70 is opened while the ISC valve full opening control is underway, the ABV 82 and the WGV 86 are fully closed immediately, and therefore the EGR gas can flow to the downstream side of the compressor early, with the result that leakage of the EGR gas to the outside can be suppressed. Note, however, that when the ABV 82 and the WGV 86 are fully closed for a long time, the second pressure P2 downstream of the compressor 24 increases excessively. Therefore, the fixed period following completion of the ISC valve full opening control, which is used to determine the point at which full closure of the ABV 82 and the WGV 86 is to be terminated, is determined appropriately in consideration of a limit value of the second pressure P2 downstream of the compressor 24, a time required for the EGR gas to flow out to the downstream side of the compressor, and so on.

Likewise in the fourth embodiment, a case in which the control relating to the lean burn operation, described in the first embodiment, is combined with the control of the ABV 82 and the WGV 86 according to this embodiment was described. More specifically, the routine of FIG. 10 or FIG. 11 is executed when the ISC valve full opening control is underway in accordance with the processing of S22 in FIG. 2. In other words, the ISC valve full opening control is prohibited during the lean burn operation. Further, by incorporating the routine of FIG. 3, the lean burn operation is prohibited during the ISC valve full opening control. This applies likewise to the other embodiments.

The invention is not limited to this configuration, however, and one or both of the control for prohibiting the ISC valve full opening control during the lean burn operation and the control for prohibiting the lean burn operation during the ISC valve full opening control, as described in the first embodiment, may be omitted. In this case, the determination as to whether or not the ISC valve full opening prohibition flag is OFF, performed in step S10 of FIG. 2, and/or the routine shown in FIG. 3, for example, may be omitted. This applies likewise to the other embodiments.

In the third embodiment, "valve closing means for closing the air bypass valve and the wastegate valve" according to the invention is realized by executing the processing of step S414 or S422.

Note that in cases where numbers such as numerical quantities, amounts, and ranges of the respective elements of the above embodiments are described, the invention is not limited to these numbers except when such limitations are specifically stated and when the elements are clearly limited to the described numbers in principle. Further, structures, methods, and so on described in the embodiments are not essential to the invention except when such limitations are specifically stated and when the invention is clearly limited to the described structures, methods, and so on in principle.

2 internal combustion engine
4 in-cylinder injector
6 spark plug
8 intake valve
10 exhaust valve
12 intake passage
14 exhaust passage
20 air cleaner
22 air flow meter
24 compressor
26 intercooler
28 throttle valve
30 surge tank
32 ISC passage
34 ISC valve
36 exhaust turbine
38 catalyst
40 muffler
42 first pressure sensor
44 second pressure sensor
50 ECU
60 high pressure EGR pipe
62 high pressure EGR cooler
64 high pressure EGR valve
66 low pressure EGR pipe
68 low pressure EGR cooler
70 low pressure EGR valve
80 intake bypass passage
82 ABV
84 exhaust bypass passage
86 WGV

What is claimed is:

1. A control apparatus for an internal combustion engine, the internal combustion engine including:
   a turbocharger including a compressor and a turbine;
   an intake bypass passage that connects an upstream side and a downstream side of the compressor in an intake passage of the internal combustion engine while bypassing the compressor;
   an air bypass valve that opens and closes the intake bypass passage;
   an exhaust bypass passage that connects an upstream side and a downstream side of the turbine in an exhaust passage of the internal combustion engine while bypassing the turbine;
   a wastegate valve that opens and closes the exhaust bypass passage;
   a low pressure exhaust gas recirculation (EGR) apparatus that partially recirculates exhaust gas from the exhaust passage downstream of the turbine to the intake passage upstream of the compressor, and the low pressure EGR apparatus including an EGR valve;
   a throttle valve disposed in the intake passage;
   an idle speed control (ISC) passage that connects an upstream side and a downstream side of the throttle valve in the intake passage; and
   an ISC valve that opens and closes the ISC passage, the control apparatus comprising:
   an electronic control unit configured to:
   (i) control the ISC valve to a predetermined opening, and adjust an amount of air flowing through the ISC passage by the ISC valve;
   (ii) execute valve opening control to set an opening of the ISC valve at a larger opening than a reference opening when a torque required by the internal combustion engine is smaller than an estimated torque that is calculated by the electric control unit;
   (iii) determine if the EGR valve of the low pressure EGR apparatus is opened while the execute valve opening control is to set an opening of the ISC valve at a larger opening than a reference opening; and
   (iv) if the EGR valve of the low-pressure EGR apparatus is determined to be opened, close the air bypass valve and the wastegate valve.

* * * * *